United States Patent
Kobayashi et al.

(10) Patent No.: US 7,896,036 B2
(45) Date of Patent: Mar. 1, 2011

(54) FUEL DEVICE, VEHICLE, FUEL FILLING DEVICE, AND FUEL FILLING SYSTEM

(75) Inventors: Nobuo Kobayashi, Toyota (JP); Yasuyuki Iida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 705 days.

(21) Appl. No.: 11/660,980

(22) PCT Filed: Feb. 1, 2006

(86) PCT No.: PCT/JP2006/302096
§ 371 (c)(1),
(2), (4) Date: Feb. 23, 2007

(87) PCT Pub. No.: WO2006/087944
PCT Pub. Date: Aug. 24, 2006

(65) Prior Publication Data
US 2008/0035235 A1    Feb. 14, 2008

(30) Foreign Application Priority Data
Feb. 16, 2005    (JP)    ............................. 2005-038782

(51) Int. Cl.
*B65B 1/30*    (2006.01)
(52) U.S. Cl. .............................. 141/94; 141/83; 141/95; 141/347
(58) Field of Classification Search ................... 141/39, 141/83, 94, 95, 197, 198, 346–350
See application file for complete search history.

(56) References Cited

U.S. PATENT DOCUMENTS
5,522,428 A  *  6/1996  Duvall .................... 137/624.11
(Continued)

FOREIGN PATENT DOCUMENTS
JP    06-044730    6/1994
(Continued)

OTHER PUBLICATIONS

Japanese Language Version of International Preliminary Report on Patentability, Appln. No. PCT/JP2006/302096, issued on Aug. 21, 2007.
(Continued)

*Primary Examiner*—Timothy L Maust
*Assistant Examiner*—Jason K Niesz
(74) *Attorney, Agent, or Firm*—Kenyon & Kenyon LLP

(57)    ABSTRACT

A fuel device for a mobile body comprises a fuel tank, a power consuming device, a fuel filling connector for receiving a fuel supply, and a power supplying connector for receiving a power supply. A fuel filling system comprises a vehicle having a fuel tank and a tank information processing unit, and a fuel filling device for filling the vehicle with fuel, wherein the tank information processing unit is started at fuel filling or started by power supply from the outside of the vehicle when the fuel tank is filled with fuel based on tank information. The vehicle comprises a fuel tank and a tank information processing unit, and the tank information processing unit is started at fuel filling. The fuel filling device has a filling nozzle which is connected with the fuel filling connector and provided with a feeding side connector for supplying power.

10 Claims, 2 Drawing Sheets

U.S. PATENT DOCUMENTS

| | | |
|---|---|---|
| 6,202,710 B1 | 3/2001 | Dill et al. |
| 6,672,340 B2 * | 1/2004 | Mutter .......................... 141/4 |
| 6,899,151 B1 * | 5/2005 | Latka et al. ................. 141/392 |
| 2005/0193989 A1 * | 9/2005 | Veenstra et al. ............. 123/527 |

FOREIGN PATENT DOCUMENTS

| | | |
|---|---|---|
| JP | 08-100895 | 4/1996 |
| JP | 08-188057 | 7/1996 |
| JP | 2001-277871 | 10/2001 |
| JP | 2002-161997 | 6/2002 |
| JP | 2002-206693 | 7/2002 |
| JP | 2003-028393 | 1/2003 |
| JP | 2003-104498 | 4/2003 |
| JP | 2003-269693 | 9/2003 |

OTHER PUBLICATIONS

English Translation of International Preliminary Report on Patentability, Appln. No. PCT/JP2006/302096, issued on Aug. 21, 2007.

* cited by examiner

FUEL DEVICE, VEHICLE, FUEL FILLING DEVICE, AND FUEL FILLING SYSTEM

RELATED APPLICATIONS

This is a 371 application of PCT/JP2006/302096 filed on 1 Feb. 2006, claiming priority to Japanese Application No. 2005-038782 filed on 16 Feb. 2005, the contents of which are incorporated herein by reference.

TECHNICAL FIELD

The present invention relates to a fuel device for a mobile body and a fuel filling system for filling, with a fuel in gas form, a tank of a gas-fueled vehicle using, for example, a high-pressure gas as fuel.

BACKGROUND ART

In attempts to reduce emission of pollutants such as carbon dioxide, sulfur oxide (Sox), and particulate materials (PM) which contribute to global warming and environmental problems, there have been developed vehicles which operate on gasified fuels. This include, for example, natural gas powered cars which use compressed natural gas (CNG) as a fuel cars powered by fuel cells filled with a hydrogen gas. Such vehicles, hereinafter referred to simply as "gas-fueled" (gas referring herein to the physical phase of the fuel when used, and not an abbreviation of "gasoline"), typically have a constitution including a fuel gas tank for storing a fuel gas such as the CNG or the hydrogen gas as the compressed gas and in which an internal combustion engine or a fuel cell is filled with the fuel gas from the fuel gas tank. Therefore, when the fuel gas in the fuel gas tank decreases, the fuel gas tank must be refilled with fuel gas at a fuel gas filling station such as a gas station.

When the fuel gas tank is filled with fuel gas in the form of compressed gas from outside, the pressure in the tank rises. Although this pressure gradually lowers as the fuel gas is used, but when the fuel gas tank is filled with the fuel gas again, the pressure in the tank again rises. That is, with each filling of the gas tank, a pressure change in the tank is generated. When the tank is rapidly filled with fuel gas, an especially large pressure change is generated. Therefore, with each repeated filling of the gas tank, the structural strength of the gas tank decreases due to the pressure changes in the tank during the filling, with the eventually result that the safety of the fuel gas tank may be compromised.

Heretofore, in consideration of the fact that the safety margin of the fuel gas tank is lowered by repeated refilling with fuel gas, a common standard procedure has been to ensure an adequate level of safety by exchanging the fuel tank after a predetermined number of filling operations.

For example, in Japanese Patent Application Laid-Open No. 2003-28393, a constitution is described in which a gas-fueled vehicle is provided with filling detection means for detecting that the fuel gas tank has been filled with the fuel gas, and counting means for counting the number of fillings detected by the filling detection means. In this case, the operator of the vehicle is alerted when the counted number of fillings reaches the predetermined allowable number. Because, with this constitution, an appropriate timing for exchanging the fuel tank can be known, the safety of the fuel tank can be secured.

Moreover, in Japanese Patent Application Laid-Open No. 2003-269693, a constitution is described in which filling time data is pre-stored in a storage unit of a vehicle, and, during the filling operation, a fuel gas filling control unit which fills the vehicle with the fuel gas transmits the filling time data to the vehicle. In this case, when the filling time data received by the fuel gas filling control unit reaches the predetermined allowable number of the filling times, the fuel gas filling control unit judges that filling should be prohibited, and an alarm is communicated to alert that filling should be prohibited. According to this constitution, it is possible to reliably prevent refilling of a gas tank which has exceeded the predetermined safety margin, and to thereby secure the safety of the fuel gas tank.

However, in both the technology described in Japanese Patent Application Laid-Open No. 2003-28393 and that in Japanese Patent Application Laid-Open No. 2003-269693, operations require a supply of electric power and, depending on a state of a vehicle battery during refilling of the fuel gas, it is possible that a refilling operation may not be counted or that data may not be transmitted, which can create problems with safety or leads to a problem that a refueling operation cannot be executed.

An object of the present invention is to provide a fuel filling system capable of securing sufficient power to reliably perform appropriate fuel filling operations, without any power shortages during refueling operations.

DISCLOSURE OF THE INVENTION

The present invention is directed to a fuel device for a mobile body having a fuel tank to store a supplied fuel, and a power consuming device mounted on the mobile body, the fuel device further comprising a fuel filling connector to fill the fuel tank with the fuel from an external facility; and a power supplying connector to supply a power from an external facility to the power consuming device.

Moreover, the present invention is directed to a fuel filling system comprising a vehicle having a tank to store a fuel and a tank information processing unit which acquires tank information indicating a use state of the tank during fuel filling to subject the tank information to predetermined processing, and a fuel filling device which fills the tank of the vehicle with the fuel, the fuel filling system being configured to fill the tank with the fuel based on the tank information, wherein the tank information processing unit is started by power supply from a power source during the fuel filling.

A fuel filling system having a constitution as above may further comprise a switch which opens or closes between the tank information processing unit and a vehicle battery, wherein, when the switch is closed during fuel filling, the tank information processing unit may be connected to the vehicle battery and started by the power supply from the vehicle battery during the fuel filling. Alternatively, the tank information processing unit may start when power is supplied from an external power source.

Furthermore, the present invention is directed to a fuel filling system comprising a vehicle having a tank to store a fuel and a tank information processing unit which acquires tank information indicating a use state of the tank during fuel filling to subject the tank information to predetermined processing, and a fuel filling device which fills the tank of the vehicle with the fuel, the fuel filling system being configured to fill the tank with the fuel based on the tank information, wherein the tank information processing unit is driven by power supplied from an external power source during the fuel filling.

Here, in a fuel filling system constituted so that the tank information processing unit is started by supply of power from the external power source, the vehicle has a fuel filling connector disposed as a fuel filling port to the tank and a receiving side connector disposed as a power supply port to the tank information processing unit; the fuel filling device has a nozzle which is connected to the fuel filling connector of the vehicle during the fuel filling; and the nozzle is provided with a feeding side connector which is connected to the receiving side connector of the vehicle to supply the power from the external power source, so that during the fuel filling, the nozzle is connected to the fuel filling connector of the vehicle to connect the feeding side connector to the receiving side connector.

In addition, in a fuel filling system having a constitution as above, the tank information processing unit may include counting means for counting the number of times when the tank has been filled with the fuel, and acquire as the tank information the number of the fuel filling operations obtained by the counting means. Furthermore, the counting means may detect that the nozzle has been connected to the fuel filling connector of the vehicle during the fuel filling, and add the number of the fuel filling operations. The tank information processing unit may transmit the tank information to the fuel filling device, and the fuel filling device may perform the fuel filling based on the received tank information.

According to the present invention described above, the tank information processing unit is constituted to operate using power supplied from an external power source or the like during fueling in a vehicle stop state. As a result, a supply of power can be secured to appropriately perform a fuel filling operation, without any power shortage or interruption, during the fuel filling operations.

BEST MODE FOR CARRYING OUT THE INVENTION

Figure 1:
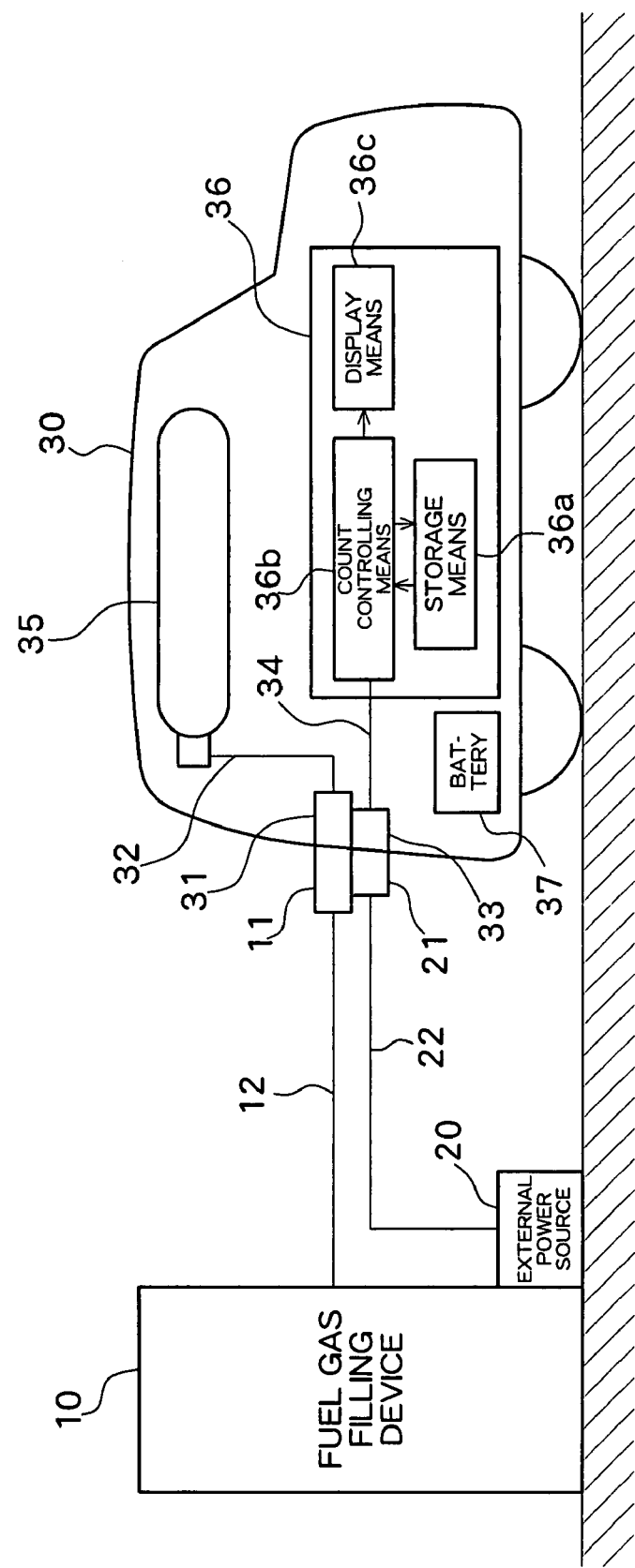
FIG. 1 shows a constitution of a fuel gas filling system according to a first embodiment of the present invention.

A constitution of a fuel gas filling system in a first embodiment of the present invention will be described with reference to FIG. 1. FIG. 1 shows the constitution of a fuel gas filling system according to this first embodiment of the present invention.

FIG. 1 illustrates a structure comprising a filling nozzle 11 on an end portion of a gas filling hose 12 connected to an external fuel gas filling device 10 of a fuel filling facility, and a feeding side connector 21 on an end portion of a power supply cable 22. On the other hand, a gas-fueled vehicle 30 is provided with, as a fuel device for the vehicle, a gas connector 31 connected to the filling nozzle 11 of the fuel gas filling device 10, and a receiving side connector 33 which is disposed adjacent to this gas connector 31 and which is connected to the feeding side connector 21 on the end portion of the power supply cable 22. In more detail, on the vehicle side, the receiving side connector 33 is disposed adjacent to the gas connector 31 so as to realize the connection of the feeding side connector 21 to the receiving side connector 33, when the filling nozzle 11 is connected to the gas connector 31 during filling of the fuel gas.

Moreover, in the gas-fueled vehicle 30 of FIG. 1, the gas connector 31 is connected to a fuel gas tank 35 for storing a fuel gas via a pipe 32. Furthermore, the receiving side connector 33 of the vehicle 30 is connected, via a wiring line 34, to a count processing unit 36 which counts the total number of times the tank has been refilled (number of filling operations), including, during a filling of the fuel gas tank 35, the ongoing filling operation. Thus, the count processing unit 36 executes a counting operation using power supplied from an external power source 20. That is, the count processing unit 36 is a power consuming device which consumes power during the filling of the fuel gas.

The count processing unit 36 includes storage means 36a such as a nonvolatile memory, count controlling means 36b, and display means 36c. The storage means 36a stores data (filling time data) indicating the total number of filling operations, and data (allowable filling time data) indicating the number of filling operations preset as the allowable number of times when the fuel gas tank 35 can be refilled.

When power is supplied from the external power source 20 to the count controlling means 36b via the wiring line 34, the count controlling means 36b reads the filling time data stored in the storage means 36a and adds 1 to this number, and then the new value is stored in the storage means 36a and displayed on the display means 36c. Furthermore, the count controlling means 36b reads the allowable filling time data from the storage means 36a to compare the allowable number of the filling operations with the new value for the filling operations. When the number of filling operations reaches the preset allowable number, the display means 36c displays a message indicating that the number of fillings has reached the allowable number, for example, a message recommending exchange of the fuel tank 35, or the like.

Next, an example of operation of a fuel gas filling system having the above constitution during filling will be described. First, the filling nozzle 11 is connected to the gas connector 31 in order to fill the tank with the fuel gas from the fuel gas filling device 10, and simultaneously the feeding side connector 21 integrated with the filling nozzle 11 is connected to the receiving side connector 33 of the vehicle 30. Thus, power is supplied from the external power source 20 to the count processing unit 36 which is the power consuming device of the vehicle 30, whereby the count processing unit 36 is driven.

When the power is supplied from the external power source 20, the count controlling means 36b of the count processing unit 36 reads the filling time data from the storage means 36a, adds 1 to this number of the filling times, stores the incremented value in the storage means 36a. At this time, the count controlling means 36b further reads the allowable filling time data from the storage means 36a to compare the allowable number of the filling operations with the new value for the number of filling operations. In a usual case, the added number of the filling operations is displayed in the display means 36c. When the added number of the filling operations reaches the allowable number of the filling operations, the message which recommends the exchange of the fuel gas tank 35, and the like are displayed in the display means 36c. In this way, the added number of the filling operations, the message which recommends the exchange of the fuel gas tank 35, and the like are displayed on a screen of the display means 36c, whereby an operator and the like can know an appropriate timing of an exchange operation of the fuel gas tank 35.

According to the fuel gas filling system of the present embodiment, the filling nozzle 11 is connected to the gas connector 31 during the filling of the fuel gas, so that power is supplied from the external power source 20 to the count processing unit 36, which utilizes the power, and the count processing unit 36 adds the number of the filling operations. Therefore, regardless of the state of the vehicle battery 37, a reliable source of power is secured for the count processing unit 36, thereby ensure that an appropriate count can be performed.

It is to be noted that the count processing unit 36 in the vehicle 30 in the present embodiment may be constituted such that it starts operations and performs the counting operation upon supply of power when the feeding side connector 21 is connected to the receiving side connector 33 during the filling of the fuel gas.

Moreover, in the present embodiment, one connector of the feeding side connector 21 and the receiving side connector 33 may be constituted as a plug, and the other connector may be constituted as an outlet having an insertion hole into which the plug is inserted. However, with such a configuration, power leakage may occur when a liquid such as water comes into contact with the plug or the like. To solve this problem, it is preferable to use a connector of a so-called "non-contact power supply system" in which coils are disposed in the feeding side connector 21 and the receiving side connector 33, respectively, so that a current passes through a coil in the feeding side connector 21, and power is supplied to the receiving side connector 33 by electromagnetic induction.

Furthermore, in addition to displaying message and the like on the screen of the display means 36c as described above, the vehicle may be provided with, for example, alarm means (not shown) including an alarm lamp and buzzer. When the number of filling operations reaches the allowable number of filling operations, the alarm lamp may be lit, and the buzzer may sound. In this manner it can ensured that the operator or the like will recognize and be aware of the appropriate timing for exchanging the fuel tank 35.

In addition, it is preferable to form a circuit in which a time constant is set so that the count processing unit 36 rises later than a rise time of a driving voltage of an integrated circuit (IC) including the count processing unit 36 during the power supply from the power source 20. In consequence, the count processing unit 36 is driven after the IC has been driven, and therefore it is possible to securely perform the count.

In the above embodiment, as information (tank information) indicating a use state of the tank 35 during the filling of the fuel gas, information on the number of filling operations with respect to the fuel gas tank 35 is used. In addition, in the example of the first embodiment, the count processing unit 36 which acquires filling time information to compare the number of the filling operations with the allowable number of the filling operations is described as an example tank information processing unit which acquires the tank information to subject the tank information to predetermined processing in order to perform the appropriate fuel gas filling operation or the like. However, the tank information applicable to the fuel gas filling system of the present invention is not limited to the filling time information, and the tank information processing unit is not limited to the count processing unit 36.

For example, in a fuel gas filling system such as the noted prior art (the technology described in Japanese Patent Application Laid-Open No. 2003-269693) in which the tank information processing unit transmits information necessary for the fuel gas filling operation (e.g., information on a type of the fuel gas tank 35 and a remaining gas volume of the tank 35 before filled, in addition to the number of the filling operations) as the tank information from the vehicle 30 to the fuel gas filling device 10, and the fuel gas filling device 10 controls the fuel gas filling operation based on this information, the tank information processing unit of the vehicle 30 which performs predetermined processing such as information communication processing (transmission processing) may be constituted to receive the power supply from the external power source 20 during refueling.

Moreover, according to the fuel gas filling system of the present embodiment, effects such as the following are obtained. That is, to fill the tank with the fuel gas in a stop state of the vehicle, the tank information processing unit (count processing unit 36) needs to be brought into an on-state even in the stop state of the vehicle. Heretofore, as it was necessary that the tank information processing unit be connected to the vehicle battery 37, the flowing of undesirable dark currents through the tank information processing unit, even in the stop state of the vehicle during a period other than the fuel gas filling time, could not be prevented. However, according to the fuel gas filling system of the present embodiment, it is not necessary that the tank information processing unit be connected to the vehicle battery 37 as in conventional systems. Therefore, the generation of dark currents as in the conventional art can be prevented.

Figure 2:
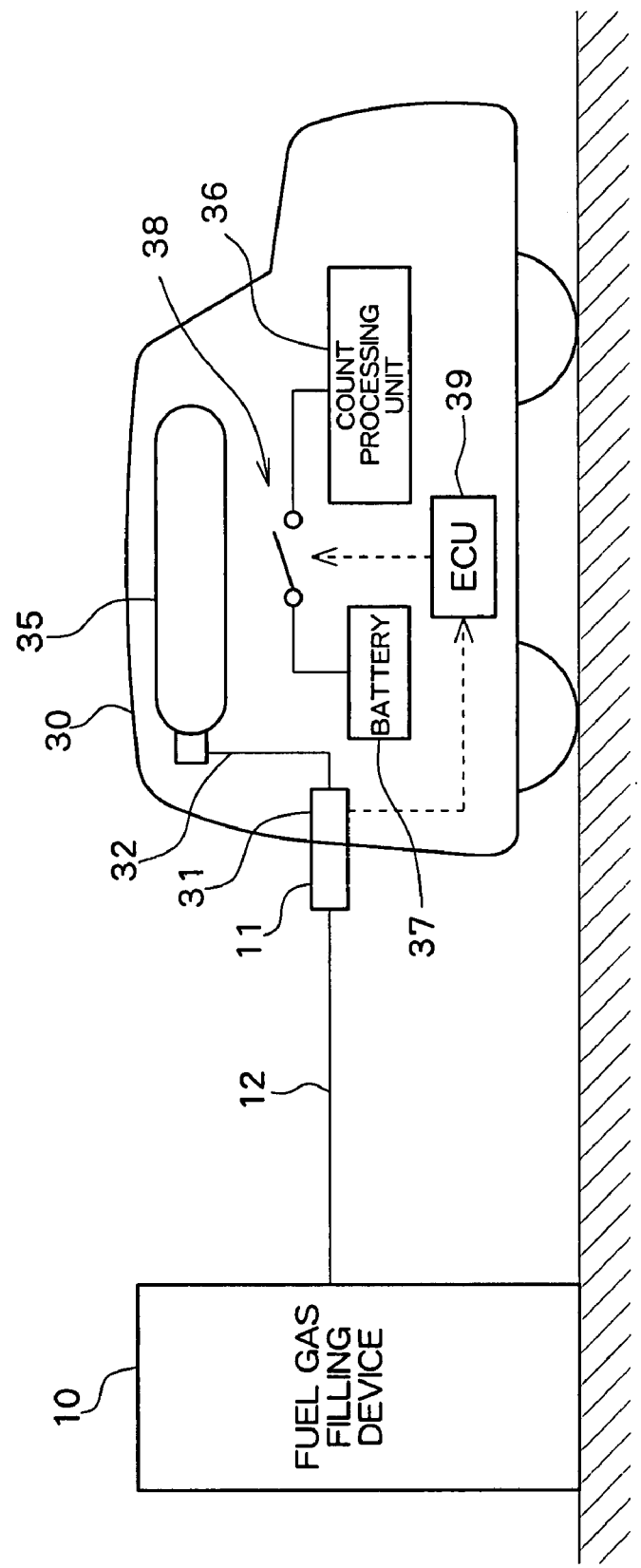
FIG. 2 shows a constitution of a fuel gas filling system according to a second embodiment of the present invention.

Furthermore, in view of the effect of avoiding the generation of dark current as in the conventional system, a switch 38, such as that shown in FIG. 2, for example, may be disposed between a count processing unit 36 and a vehicle battery 37, and the switch 38 may be controlled so as to open during normal operation and close during fueling operations. In FIG. 2, which shows a second embodiment of the present invention, a control unit (ECU) 39 detects the connection of a filling nozzle 11 to a gas connector 31, and executes a control to close the switch 38, but the control may be performed by another control means. With such a constitution, because the count processing unit 36 is not connected to the vehicle battery 37 during the normal time, generation of conventional dark currents can be avoided. However, the constitution of the above embodiment is more preferable as compared with the constitution of FIG. 2 in that the power is secured without any power supply from the vehicle battery 37, so that the count processing unit 36 can execute the operation during the filling of the fuel gas to perform an appropriate count, regardless of the state of the vehicle battery 37.

Although illustrative embodiments for carrying out the present invention have been described above, but the present invention is not limited to these examples, and can naturally be implemented in various modes without departing from the scope of the present invention. For example, although in the above embodiments, examples where the fuel was used in a gaseous state were described, the present invention is applicable for use with fuels in other states (e.g., liquid or the like). In addition, the present invention is also applicable to a mobile body (e.g., a boat, an airplane or the like) other than the vehicle.

The invention claimed is:

1. A fuel filling system comprising:
   a vehicle having a tank which stores a fuel, and a tank information processing unit which acquires tank information indicating a use state of the tank during fuel filling to subject the tank information to a predetermined processing; and
   a fuel filling device which fills the tank of the vehicle with the fuel,
   the fuel filling system being configured to fill the tank with the fuel based on the tank information,
   wherein the tank information processing unit is started by the supply of power from a power source external to the vehicle during the fuel filling,
   wherein the tank information processing unit includes counting means for counting the times the tank has been filled with fuel, and acquires, as the tank information, the number of fuel filling operations counted by the counting means, and
   wherein the counting means detects that the nozzle has been connected to the fuel filling connector of the vehicle during the fuel filling, and that power is supplied to the counting means from a power source external to the vehicle, and adds the number of the fuel filling times.

2. The fuel filling system according to claim 1, wherein the vehicle has a fuel filling connector disposed as a fuel filling port to the tank, and a receiving side connector disposed as a power supply port to the tank information processing unit, the fuel filling device has a nozzle which is connected to the fuel filling connector of the vehicle during the fuel filling, and the nozzle is provided with a feeding side connector which is connected to the receiving side connector of the vehicle to perform the power supply from the external power source, so that, during the fuel filling, the nozzle is connected to the fuel filling connector of the vehicle to connect the feeding side connector to the receiving side connector.

3. The fuel filling system according to claim 1, wherein the tank information processing unit transmits the tank information to the fuel filling device, and the fuel filling device performs fuel filling based on the received tank information.

4. The fuel filling system according to claim 1, wherein the fuel is in a gaseous state.

5. A vehicle comprising:

a tank which stores a fuel supplied from an external fuel filling device and a tank information processing unit which acquires tank information indicating a use state of the tank during fuel filling to subject the tank information to predetermined processing, the vehicle being filled with the fuel from the fuel filling device based on the tank information, wherein the tank information processing unit is started by the supply of power from a power source external to the vehicle during the fuel filling, wherein the tank information processing unit includes counting means for counting the times the tank has been filled with fuel, and acquires, as the tank information, the number of fuel filling operations counted by the counting means, and wherein the counting means detects that the nozzle has been connected to the fuel filling connector of the vehicle during the fuel filling, and that power is supplied to the counting means from a power source external to the vehicle, and adds the number of the fuel filling times.

6. The vehicle according to claim 5, wherein the fuel is in a gaseous state.

7. The fuel filling system according to claim 1, wherein the tank information at least includes the number of filling operations of the tank; and a display device that indicates that the number of filling operations has reached a predetermined allowable number when the number of filling operations has reached the predetermined allowable number.

8. The fuel filling system according to claim 7, wherein the display device displays the current number of filling operations of the tank.

9. The fuel filling system according to claim 5, wherein the tank information at least includes the number of filling operations of the tank; and a display device that indicates that the number of filling operations has reached a predetermined allowable number when the number of filling operations has reached the predetermined allowable number.

10. The fuel filling system according to claim 9, wherein the display device displays the current number of filling operations of the tank.

* * * * *

UNITED STATES PATENT AND TRADEMARK OFFICE
CERTIFICATE OF CORRECTION

PATENT NO. : 7,896,036 B2
APPLICATION NO. : 11/660980
DATED : March 1, 2011
INVENTOR(S) : Nobuo Kobayashi et al.

It is certified that error appears in the above-identified patent and that said Letters Patent is hereby corrected as shown below:

| Column | Line | |
|--------|------|---|
| 8 | 24 | Change "fuel filling system" to --vehicle--. |
| 8 | 31 | Change "fuel filling system" to --vehicle--. |

Signed and Sealed this
Twenty-eighth Day of August, 2012

David J. Kappos
*Director of the United States Patent and Trademark Office*